United States Patent
Harding et al.

(10) Patent No.: US 7,099,017 B2
(45) Date of Patent: Aug. 29, 2006

(54) METHODS AND APPARATUS FOR MEASURING FLOW OPENING AREAS

(75) Inventors: Kevin George Harding, Niskayuna, NY (US); Francis Howard Little, Cincinnati, OH (US); Joseph Benjamin Ross, Cincinnati, OH (US); Jeffery John Reverman, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 506 days.

(21) Appl. No.: 10/446,295

(22) Filed: May 28, 2003

(65) Prior Publication Data

US 2004/0239948 A1    Dec. 2, 2004

(51) Int. Cl.
*G01B 11/24* (2006.01)
*G06K 9/36* (2006.01)

(52) U.S. Cl. .................. 356/601; 356/628; 382/286
(58) Field of Classification Search ............... 356/601, 356/628, 635; 382/286, 141
See application file for complete search history.

(56) References Cited

U.S. PATENT DOCUMENTS

| | | | | |
|---|---|---|---|---|
| 3,773,422 A | * | 11/1973 | Stavis et al. | 356/630 |
| 4,498,776 A | * | 2/1985 | Smith | 356/623 |
| 4,646,354 A | * | 2/1987 | Naito et al. | 382/286 |
| 4,741,621 A | | 5/1988 | Taft et al. | |
| 4,767,272 A | | 8/1988 | Kildea | |
| 5,436,462 A | | 7/1995 | Hull-Allen | |
| 2003/0228069 A1 | * | 12/2003 | Leboeuf | 382/286 |

FOREIGN PATENT DOCUMENTS

| | | |
|---|---|---|
| EP | 3313932 A1 | 10/1984 |
| EP | 19506526 A1 | 8/1996 |

* cited by examiner

*Primary Examiner*—Gregory J. Toatley, Jr.
*Assistant Examiner*—Roy M. Punnoose
(74) *Attorney, Agent, or Firm*—William Scott Andes; Armstrong Teasdale LLP

(57) ABSTRACT

A method and apparatus for measuring an opening defined within object using an optical sensor system is provided. The method includes positioning an illumination source adjacent the opening, illuminating a perimeter circumscribing the opening, receiving an image of the illuminated boundary, and calculating an area within the received boundary. The system includes a light source oriented to project a first sheet of light intersected by a first portion of the opening perimeter, the light source projecting a second sheet of light intersected by a second portion of the opening perimeter, a light detector receiving a portion of the sheet of light intersected by the object opening perimeter and reflected toward the light detector, and an image processor communicatively coupled to the light detector, the image processor programmed to sample an image from the detector and programmed determine the dimensions of the object opening from the sampled image.

18 Claims, 3 Drawing Sheets

METHODS AND APPARATUS FOR MEASURING FLOW OPENING AREAS

BACKGROUND OF THE INVENTION

This invention relates generally to optical systems and more particularly, to methods and apparatus for measuring an opening area defined within a flow nozzle.

At least some known gas turbine engines include a compressor, a combustor, and at least one turbine coupled in a serial axial-flow relationship. The compressor compresses air which is then channeled to the combustor. The compressed air is mixed with fuel and ignited within the combustor to generate combustion gases which are channeled to the turbine. The turbine extracts energy from the combustion gases to power the compressor, as well as to produce useful work to propel an aircraft in flight or to power a load, such as an electrical generator.

A nozzle throat area of the engine is a critical parameter affecting engine efficiency. Accordingly, the nozzle throat area is measured during periodic inspections to verify clearances in the engine fluid path. New nozzle throats are carefully designed to provide a specific area value. Accurately measuring an opening area of the nozzle may also be relevant in determining a manufacturing time of the nozzle, as well as subsequent maintenance and repair costs and activities.

Conventional nozzle throat inspection methods include using a mechanical gauge. At least one known mechanical gauge includes a complex mechanical analog computer that multiplies a width of the throat by a height measured at several specified locations. Another known area gauge uses electronic linear voltage differential transformer (LVDT) sensors to measure the throat width and height values, and then a computer calculates the area. However, obtaining accurate measurements at the various orientations of the nozzle throat may be a difficult task. Furthermore, because of the contours and dimensions of the nozzle throat, using such gauges may be a costly and time-consuming process.

BRIEF DESCRIPTION OF THE INVENTION

In one aspect, a method for measuring an opening defined within an object using an optical sensor system is provided. The method includes positioning an illumination source adjacent the opening, illuminating a perimeter circumscribing the opening, receiving an image of the illuminated perimeter, and calculating an area within the received boundary.

In another aspect, an opening measurement system for measuring an area of an object opening is provided. The system includes a light source oriented toward a first side of the object, the light source projecting a first sheet of light intersected by a first portion of the opening perimeter, and the light source projecting a second sheet of light intersected by a second portion of the opening perimeter, a light detector receiving a portion of the sheet of light intersected by the object opening perimeter and reflected toward the light detector, and an image processor communicatively coupled to the light detector, the image processor programmed to sample an image from the detector and programmed determine the dimensions of the object opening from the sampled image.

DETAILED DESCRIPTION OF THE INVENTION

Figure 1:
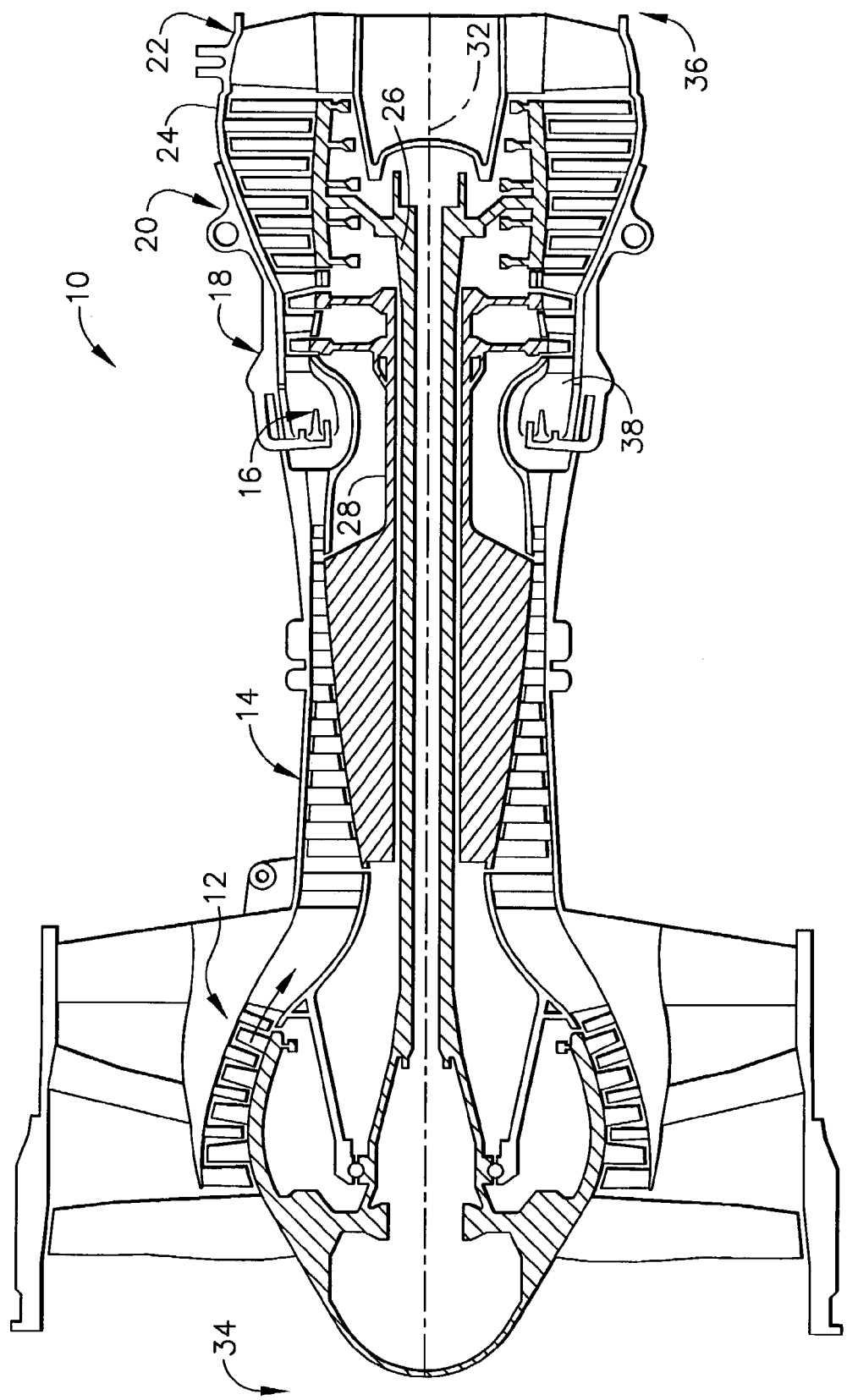
FIG. 1 is a schematic illustration of an exemplary gas turbine engine.

FIG. 1 is a schematic illustration of a gas turbine engine 10 including a low-pressure compressor 12, a high-pressure compressor 14, and a combustor 16. Engine 10 also includes a high-pressure turbine 18, a low-pressure turbine 20, an exhaust frame 22 and a casing 24. A first shaft 26 couples low-pressure compressor 12 and low-pressure turbine 20, and a second shaft 28 couples high-pressure compressor 14 and high-pressure turbine 18. Engine 10 has an axis of symmetry 32 extending from an upstream side 34 of engine 10 aft to a downstream side 36 of engine 10. A turbine nozzle area 38 includes a plurality of nozzle throats (not shown in FIG. 1) circumferentially arranged about engine 10 between combustor 16 and high pressure turbine 18. In one embodiment, gas turbine engine 10 is a GE90 engine commercially available from General Electric Company, Cincinnati, Ohio.

In operation, air flows through low-pressure compressor 12 and compressed air is supplied to high-pressure compressor 14. Highly compressed air is delivered to combustor 16. Combustion gases from combustor 16 propel turbines 18 and 20. High pressure turbine 18 rotates second shaft 28 and high pressure compressor 14, while low pressure turbine 20 rotates first shaft 26 and low pressure compressor 12 about axis 32.

Figure 2:
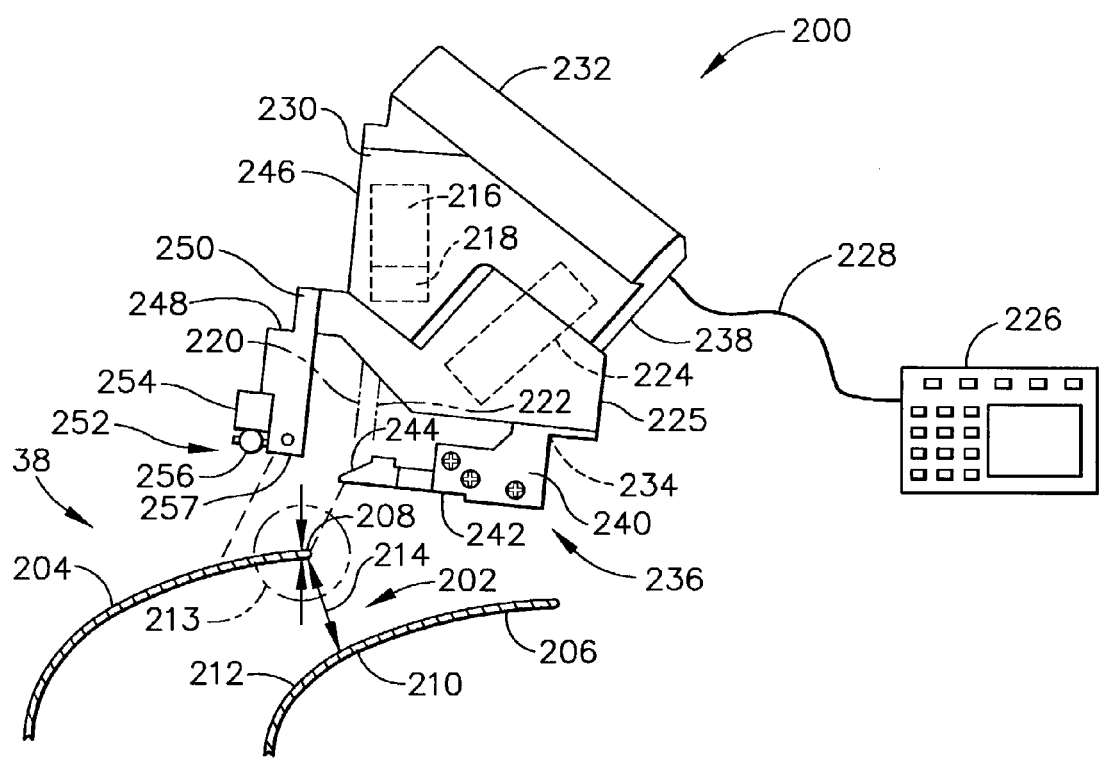
FIG. 2 is a side view of an exemplary measurement device used to measure a nozzle throat opening area of a turbine nozzle.

FIG. 2 is a side view of an exemplary measurement device 200 used to measure a nozzle throat opening area 202 of turbine nozzle 38. Opening 202 defines a portion of a flow passage through turbine engine 10. Opening 202 is formed from an arcuate first wall 204, an arcuate second wall 206 and two substantially parallel sidewalls (not shown) that extend between walls 204 and 206, to define a substantially rectangular opening 202. Specifically, opening 202 is bounded by a trailing edge 208 of wall 204 and a portion of wall 206 identified by a transverse line 210 projected on an interior face 212 of wall 206 from trailing edge 208, such that a distance of separation 214 is minimized within throat opening 202. An area 213 bounds trailing edge 208.

In the exemplary embodiment, measurement device 200 uses an illumination source, such as a laser 216, and a combination of lenses and mirrors 218 to generate planar sheets of light. A beam, emitted from laser 216 may be directed toward the combination of lenses and mirrors to refocus the beam into one or more planes of light, or light sheets. The combination of lenses and mirrors are oriented to project a first light sheet 220 in a plane substantially orthogonally toward trailing edge 208 and a second light sheet 222 in a plane substantially parallel to light sheet 220. Measurement device 200 is positioned in alignment with opening 202 such that light sheet 220 intersects trailing edge 208 forming an illuminated line across trailing edge 208. The orientation of light sheet 222 is fixed in relation to light sheet 220 such that a second illuminated line formed at the intersection of light sheet 222 and wall 206 substantially coincides with transverse line 210. More specifically, an orientation of light sheet 222 is adjusted, prior to use, to substantially illuminate transverse line 210. Light sheet 222 also illuminates a line on each sidewall that extends between walls 204 and 206. The illuminated lines at trailing edge 208, transverse line 210 and across the sidewalls define a boundary that is representative of a height and width of opening 202. Although opening 202 is substantially rectangularly-shaped, each illuminated line may have deformities due to deformities in trailing edge 208, transverse line 210 and the sidewalls.

One or more optical sensors 224 are positioned to view the width and height of opening 202. In the exemplary embodiment, at least one optical sensor 224 is a video camera. In an alternate embodiment, at least one optical sensor 224 is a digital camera. A sensor alignment fixture 225 is coupled to measurement device 200 to position optical sensors 224 in alignment with respect to opening datums to facilitate measuring opening area 202 accurately. Specifically, optical sensors 224 are positioned at known angles relative to light sheets 220 and 222 to sense the illuminated lines and measure their location relative to an image plane of optical sensors 224. Each sensor 224 is communicatively coupled to an image processor 226 through conduit 228. A digital representation of the illuminated lines circumscribing the boundary of opening 202 is transmitted to image processor 226. In the exemplary embodiment, a filter coupled to the light receiving end of each optical sensor 224 filters each light stripe to substantially prevent all non-illuminated line illumination. In an alternative embodiment, the receiving end of optical sensor 224 is unfiltered. Calibration functions are executed in processor 226 to extract dimensional coordinates of the location of the illuminated lines defining a perimeter of opening 202. In one embodiment, the perimeter includes four substantially straight illuminated lines. In an alternative embodiment, the perimeter is defined by curved or wavy lines due to design complexity and/or part distortion during use. In the exemplary embodiment, processor 226 includes a digitizer that receives an image from optical sensor 224 and converts the received image into a pixelized image, and an extractor that determines an area in within the boundaries of the pixelized image. Processor 226 displays an image from the field of view of optical sensors 224 and may output the image to a printer. Additionally, processor 224 may interface directly to a network to transmit images and part data to other systems.

Sensor alignment fixture 225 is coupled to a body 230 of measurement device 200. Body 230 includes a handle 232 for manually positioning measurement device 200 with respective to opening 202. Body 230 includes an emitting end 234 for projecting light toward opening 202, and an alignment finger 236 that extends from body emitting end 234. Alignment finger 236 includes an attachment portion 240 for coupling alignment finger 236 to body 230, an extension portion 242 for adjusting a length of alignment finger 236, and an engagement portion 244 for engaging a portion of the perimeter defining opening 202, such as, for example, trailing edge 208. A second end 246 of body emitting end 234 includes a shoulder 248 that extends outwardly from body 230 towards engagement portion 244 and is substantially perpendicular with respect to alignment finger 236. Shoulder 248 includes an attachment end 250 for coupling shoulder 248 to body 230, and a contact end 252 that includes a biased support assembly 254. In the exemplary embodiment, support assembly 254 is a ball bearing support assembly that includes an end 256 that extends outwardly at least partially beyond an outer surface 257 of shoulder 248.

Optical sensors 224 receive a large number of discrete points from the illuminated lines defining the perimeter of opening 202. Sensors 224 use this data to compute the area circumscribed by the illuminated lines. In one embodiment, an area of nozzle throat opening 202, is computed by using measurement device 200 together with a known fixture (not shown) to measure the area of two half throat openings adjacent to a principal throat of the nozzle. Combining the results yields the area of a complex shape or a total area of a plurality of noncontiguous openings.

In operation, body 230 is manually positioned proximate opening 202 such that engagement portion 244 engages trailing edge 208 and such that contact end 256 contacts an exterior surface 304 of wall 206. In the engaged position, light sheet 220 illuminates trailing edge 206, and light sheet 222 illuminates transverse line 210 and the sidewalls defining opening 202. Optical sensor 224 is aligned with respect to opening 202 such that the lines illuminating trailing edge 208, transverse line 210, and the sidewalls are within a field of view of optical sensors 224. Each optical sensor 224 receives the illuminated line image and transmits the image to processor 226 via cables 228. Processor 226 determines the area bounded by the illuminated lines based on the predetermined angular alignment of light sheets 220 and 220, engagement end 244, and optical sensors 224. Processor 226 displays the results of the calculations in a form commanded by a user.

Figure 3:
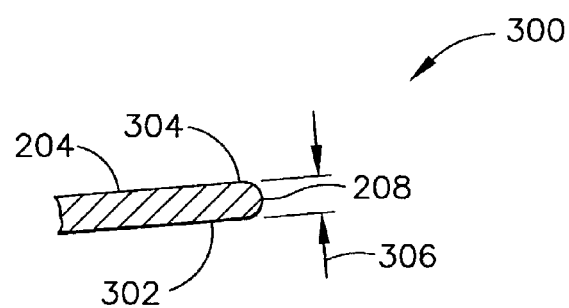
FIG. 3 is an enlarged view 300 of trailing edge 208.

FIG. 3 is an enlarged view 300 of trailing edge 208. Trailing edge 208 includes an interior surface 302 that defines opening 202 and is opposite side 206. Engagement portion 244 engages interior surface 302, and when manual pressure is exerted through handle 232, portion 244 maintains body 230 in alignment with opening 202. Light sheet 220 intersects trailing edge 208 on an exterior surface 304 of trailing edge 208. A distance 306 represents a corrected distance that is accounted for in processor 226 when the area of opening 202 is calculated. In actuality, opening 202 is bounded in part by interior surface 302, and measurement device 200 measures the area defined by the illuminated line boundaries, and as such distance 306 is accounted for during the calculations executed by processor 226.

Figure 4:
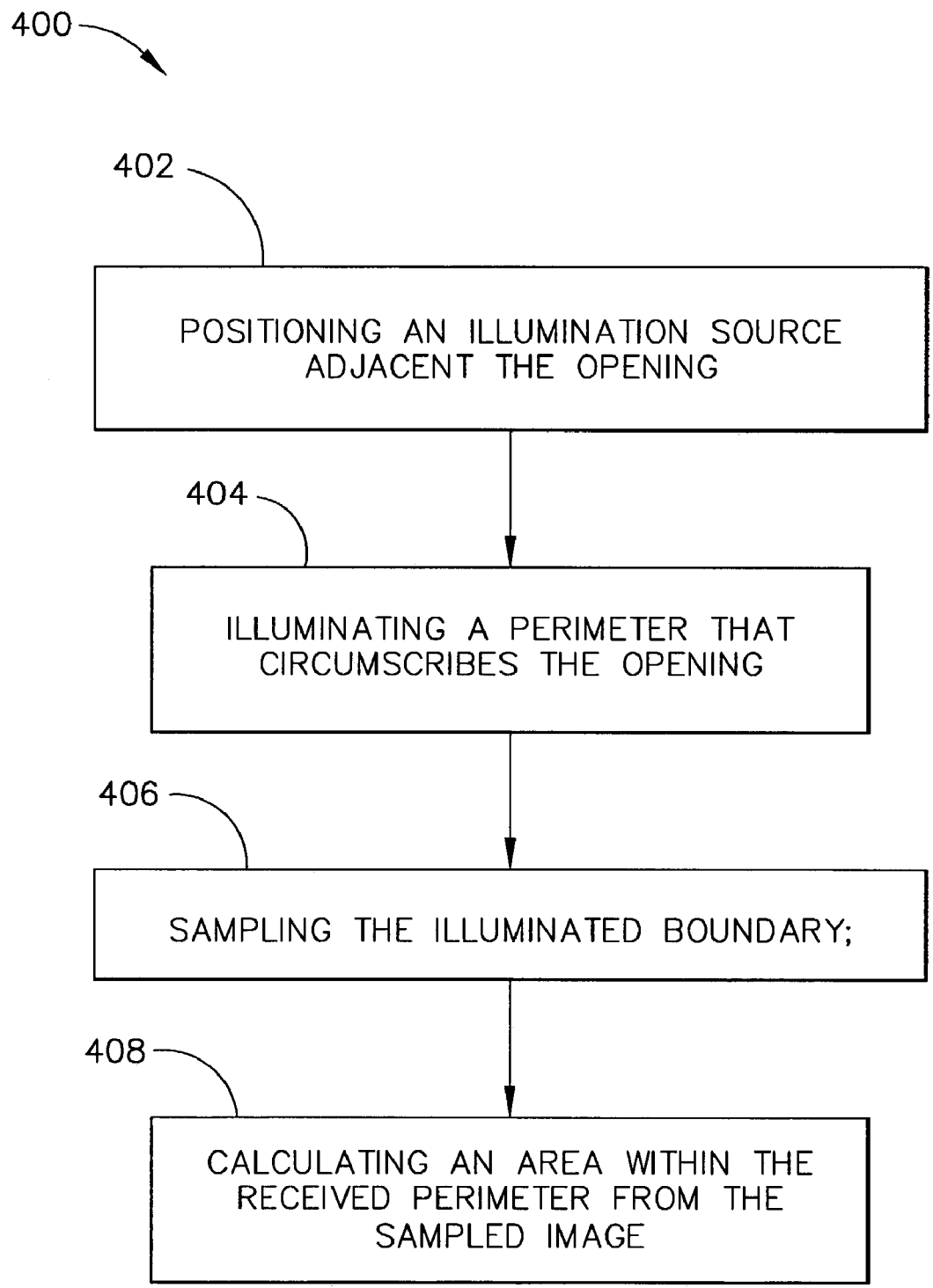
FIG. 4 is a flow chart illustrating an exemplary method for measuring an opening of an object using an optical sensor system that includes a measurement device.

FIG. 4 is a flow chart illustrating an exemplary method 400 for measuring an opening of an object using an optical sensor system that includes a measurement device, such as device 200 (shown in FIG. 2). The method includes positioning 402 an illumination source adjacent the opening. In the exemplary embodiment, the illumination source includes at least one laser diode. The laser light beam from the laser diode is split into two beams that are directed to a cylindrical lens that redirects the laser beams into two laser light sheets that exit the illumination source substantially parallel with respect to one another. An alignment finger coupled to the illumination source engages a surface defining the opening to be measured such that the illumination source is aligned with a predetermined opening boundary, such as, but not limited to, a trailing edge of a nozzle opening and a predetermined reference area to be measured. More specifically, the illumination source is aligned such that, when the alignment finger engages the surface, the light sheets illuminate predetermined portions of the opening to be measured without further adjustment of the illumination source. Furthermore, the alignment is adjustable to compensate for measuring different size objects and objects with different shapes. The illumination source illuminates 404 the boundary that circumscribes and defines the opening using the light sheets. In the exemplary embodiment, the boundary of the opening is defined by two laser light sheets. In an alternative embodiment, depending on the complexity of the opening, additional light sheets may be required to illuminate the opening boundary. Each light sheet intersects a surface of the object near the object opening such that the intersection creates an illuminated line on the object near the object opening. The illuminated line is aligned substantially parallel with the opening boundary, such that the object boundary may be correlated to the position of each illuminated line. Other boundaries of the opening may be similarly illuminated by one or more illuminated lines until the entire perimeter of the opening is defined by lines illuminated from the illumination source. In an alternative embodiment, portions of the boundary not illuminated by light lines are inferred by processing software in the image processor, such that the entire perimeter of the opening is defined by a combination of light lines and inferred boundaries.

A light detector, or optical receiver is positioned in substantial alignment with the illuminated line boundaries in the receiver field of view such that the optical receiver samples 406 the illuminated boundary. In one embodiment, a receiving lens within the optical receiver includes a filter that substantially removes non-illuminated line illumination from the optical receiver view, such as, for example, ambient lighting and sunlight. Filtering the optical receiver input may facilitate increasing the contrast of the opening perimeter, thereby facilitating enhancing the effectiveness the optical receiver. In the exemplary embodiment, the optical receiver is a video camera. In an alternative embodiment, the optical receiver is a digital camera.

The received image is transmitted to a digital image processor that includes a digitizer that digitizes the received video image. The area of the opening bounded by the illuminated lines in the digital image is calculated 408 by the image processor. In the exemplary embodiment, the image processor calculates 408 a minimum area within the received boundary. The image processor extracts two-dimensional coordinate information from the digitized image, and using alignment and calibration information accessible to the image processor, determines the coordinates that are within the received boundary. The area represented by the total coordinates is calculated 408 and output from the image processor in a predetermined format selected by the user.

While the present invention is described with reference to an engine nozzle throat opening area, numerous other applications are contemplated. For example, it is contemplated that the present invention may be applied to any system wherein opening perimeters may be illuminated and the illuminated perimeters viewed from a determinable angle and distance, such as, but not limited to, heat exchangers, valves, and cooling passages.

The above-described opening measurement system is cost-effective and highly reliable for determining the dimensions of an opening in an object. More specifically, the methods and systems described herein facilitate determining the boundaries of the opening, and the area bounded by the boundaries. In addition, the above-described methods and systems facilitate providing an accurate and repeatable measurement of the opening quickly with minimal set-up time or operator training. As a result, the methods and systems described herein facilitate reducing outage duration and maintenance costs in a cost-effective and reliable manner.

Exemplary embodiments of opening measurement systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for measuring an opening defined within an object using an optical sensor system, said method comprising:
   positioning an illumination source adjacent the opening;
   illuminating a perimeter circumscribing the opening;
   sampling an image of an illuminated line formed at the intersection between a light sheet and the object opening perimeter; and
   calculating an area within the received boundary from the sampled image.

2. A method in accordance with claim 1 wherein positioning an illumination source comprises positioning the illumination source such that an alignment finger coupled to the illumination source engages a surface bounding the opening.

3. A method in accordance with claim 1 wherein illuminating a perimeter that circumscribes the opening comprises:
   illuminating a first portion of the opening perimeter with a first light sheet; and
   illuminating a second portion of the opening perimeter with a second light sheet.

4. A method in accordance with claim 3 wherein illuminating the first portion of the opening perimeter comprises illuminating the first portion of the opening with a light source that projects a sheet of light that is oriented in a plane that is substantially parallel to the first portion of the opening perimeter.

5. A method in accordance claim 1 wherein sampling an image of an illuminated line formed at the intersection between a light sheet and the object opening perimeter comprises receiving each illuminated line with an optical receiver.

6. A method in accordance with claim 5 wherein receiving each illuminated line with an optical receiver comprises receiving each illuminated line with at least one of a video camera and a digital camera.

7. A method in accordance claim 1 wherein sampling an image of an illuminated line formed at the intersection between a light sheet and the object opening perimeter comprises filtering each line to facilitate preventing receipt of substantially all non-illuminated line illumination.

8. A method in accordance with claim 1 wherein calculating an area within the received perimeter comprises calculating a minimum area defined within the received perimeter.

9. A method in accordance with claim 8 further comprising:
   extracting two-dimensional coordinate information from the digitized image: and
   determining the coordinates within the received perimeter.

10. A method in accordance with claim 1 wherein calculating an area within the received perimeter comprises digitizing the received video image.

11. An opening measurement system for measuring an area of an object opening, said system comprising:
- a body comprising an emitting end and an alignment finger extending outwardly from said body emitting end;
- a light source oriented to illuminate a first side of the object, said light source projecting a first sheet of light intersected by a first portion of the opening perimeter, said light source projecting a second sheet of light intersected by a second portion of the opening perimeter;
- a light detector oriented toward said illuminated portions of the opening perimeter and receiving a portion of said sheet of light intersected by the object opening perimeter and reflected toward said light detector; and
- an image processor communicatively coupled to said light detector, said image processor programmed to sample an image from said detector and programmed determine the dimensions of the object opening from said sampled image.

12. An opening measurement system in accordance with claim 11 wherein said light source comprises a laser diode and an optical lens, said optical lens focusing light from said laser diode into said sheet of light.

13. An opening measurement system in accordance with claim 12 wherein said light source comprises two separate light sources, each said light source illuminating a different boundary.

14. An opening measurement system in accordance with claim 11 wherein said light source comprises:
- a body comprising a handle for manually positioning said light source into substantial alignment with the object; and
- an emitting end for projecting light toward the object.

15. An opening measurement system in accordance claim 11 wherein said alignment finger comprises:
- an attachment portion for coupling said finger to said body;
- an extension portion for adjusting a length of said finger; and
- an engagement portion for engaging a surface defining said object opening.

16. An opening measurement system in accordance with claim 11 wherein said body comprises a shoulder extending from said body toward said object substantially perpendicularly with respect to said alignment finger.

17. An opening measurement system in accordance with claim 16 wherein said shoulder comprises an attachment end for attaching said shoulder to said body, and a contact end comprising a biased support assembly extending outwardly at least partially beyond an outer surface of said shoulder toward said contact end.

18. An opening measurement system in accordance with claim 11 wherein said computer comprises:
- a digitizer configured to receive an image from said light detector and convert said received image into a pixelized image; and
- an extractor configured to determine an opening area within said pixelized image.

* * * * *

UNITED STATES PATENT AND TRADEMARK OFFICE
CERTIFICATE OF CORRECTION

PATENT NO. : 7,099,017 B2  Page 1 of 1
APPLICATION NO. : 10/446295
DATED : August 29, 2006
INVENTOR(S) : Harding et al.

It is certified that error appears in the above-identified patent and that said Letters Patent is hereby corrected as shown below:

In Claim 5, column 6, line 40, between "accordance" and "claim" insert -- with --.
In Claim 7, column 6, line 47, between "accordance" and "claim" insert -- with --.
In Claim 15, column 8, line 5, between "accordance" and "claim" insert -- with --.

Signed and Sealed this

Fourth Day of December, 2007

JON W. DUDAS
*Director of the United States Patent and Trademark Office*